(12) United States Patent
Halladin et al.

(10) Patent No.: US 11,268,591 B2
(45) Date of Patent: Mar. 8, 2022

(54) VIBRATING MACHINE WITH A BEARING DEVICE AND METHOD OF OPERATING A VIBRATING MACHINE

(71) Applicant: SPALECK GMBH & CO. KOMMANDITGESELLSCHAFT, Bocholt (DE)

(72) Inventors: Jörg Halladin, Bocholt (DE); Niklas Lohscheller, Rhede (DE)

(73) Assignee: SPALECK GMBH & CO. KOMMANDITGESELLSCHAFT, Bocholt (DE)

( * ) Notice: Subject to any disclaimer, the term of this patent is extended or adjusted under 35 U.S.C. 154(b) by 48 days.

(21) Appl. No.: 16/765,683

(22) PCT Filed: Nov. 15, 2018

(86) PCT No.: PCT/EP2018/081330
§ 371 (c)(1),
(2) Date: May 20, 2020

(87) PCT Pub. No.: WO2019/105744
PCT Pub. Date: Jun. 6, 2019

(65) Prior Publication Data
US 2020/0300332 A1      Sep. 24, 2020

(30) Foreign Application Priority Data
Nov. 29, 2017 (DE) .................... 10 2017 128 230.0

(51) Int. Cl.
*F16F 15/027* (2006.01)
*B65G 27/32* (2006.01)
*F16F 15/023* (2006.01)

(52) U.S. Cl.
CPC .......... *F16F 15/0275* (2013.01); *B65G 27/32* (2013.01); *F16F 15/0232* (2013.01)

(58) Field of Classification Search
CPC .. F16F 15/0275; F16F 15/0232; B65G 27/10; B65G 27/08; B65G 27/32; B06B 1/16
See application file for complete search history.

(56) References Cited

U.S. PATENT DOCUMENTS 4,042,230 A * 8/1977 Akimoto .................. F16F 7/112
                                                              267/136
5,765,800 A * 6/1998 Watanabe ........... F16F 15/0232
                                                              248/550

(Continued)

FOREIGN PATENT DOCUMENTS

DE      2427907 C2     1/1975
DE      2357838 A1     2/1975

(Continued)

OTHER PUBLICATIONS

International Search Report; priority document.

*Primary Examiner* — Thomas W Irvin
(74) *Attorney, Agent, or Firm* — Greer, Burns & Crain, Ltd.

(57) ABSTRACT

A vibrating machine including a first machine part that vibrates in operation, a second machine part connected to an installation area of the vibrating machine, and a vibratory drive. A resilient bearing is arranged between the machine parts and has at least one air spring per support point and at least one compressed air reservoir fluidically connected to the air spring. A throttle is switched intermediate the air spring and the compressed air reservoir. The first machine part bearing has a resonant or natural frequency lower than an operating frequency of the vibrating machine. The bearing system has a frequency-dependent lower stiffness level with high damping at low frequencies, an upper stiffness level with low damping at higher frequencies, and a transition zone at an intermediate transitional frequency. The throttle is dimensioned such that the transitional frequency (Continued)

is close to, preferably slightly above, the resonant or natural frequency.

21 Claims, 11 Drawing Sheets

(56) References Cited

U.S. PATENT DOCUMENTS

| | | | | |
|---|---|---|---|---|
| 7,073,644 | B2 * | 7/2006 | Kato | F16F 15/0275 |
| | | | | 188/378 |
| 8,800,736 | B2 * | 8/2014 | Kashani | F16F 15/0275 |
| | | | | 188/379 |
| 2003/0146554 | A1 * | 8/2003 | Kato | F16F 15/0275 |
| | | | | 267/136 |
| 2003/0197318 | A1 | 10/2003 | Jones et al. | |
| 2009/0224444 | A1 * | 9/2009 | Mayama | F16F 15/0275 |
| | | | | 267/118 |
| 2009/0283942 | A1 * | 11/2009 | Nakamura | B60G 17/0155 |
| | | | | 267/64.13 |
| 2010/0001445 | A1 * | 1/2010 | Maruyama | F16F 15/0275 |
| | | | | 267/113 |
| 2012/0193846 | A1 * | 8/2012 | Kashani | F16F 15/0275 |
| | | | | 267/140.14 |
| 2016/0089697 | A1 | 3/2016 | Schmitt | |

FOREIGN PATENT DOCUMENTS

| | | |
|---|---|---|
| DE | 4233212 A1 | 4/1994 |
| DE | 202012003315 U1 | 4/2012 |
| DE | 202015106653 U1 | 1/2016 |
| EP | 3034905 A1 | 6/2016 |
| WO | 03089806 A1 | 10/2003 |

* cited by examiner

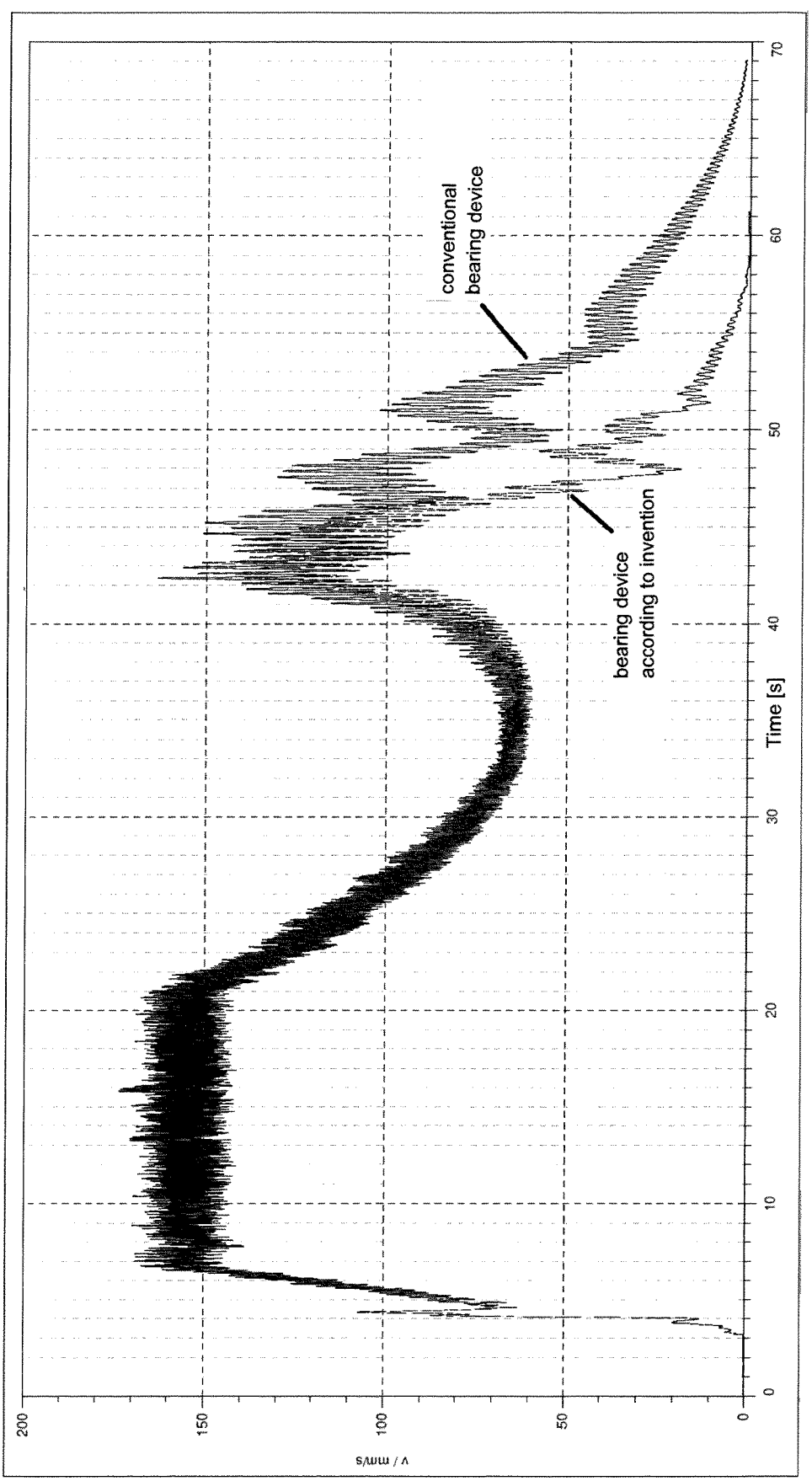

VIBRATING MACHINE WITH A BEARING DEVICE AND METHOD OF OPERATING A VIBRATING MACHINE

CROSS-REFERENCES TO RELATED APPLICATIONS

This application claims the benefit of the International Application No. PCT/EP2018/081330, filed on Nov. 15, 2018, and of the German patent application No. 10 2017 128 230.0 filed on Nov. 29, 2017, the entire disclosures of which are incorporated herein by way of reference.

FIELD OF THE INVENTION

The invention relates to a vibrating machine comprising a first machine part that vibrates in operation; a second machine part connected to an installation area of the vibrating machine; and a vibratory drive, wherein a resilient bearing device is arranged between the machine parts and has at least one air spring per support point and at least one compressed air reservoir fluidically connected to the air spring, and wherein a throttle is switched in between the air spring and the compressed air reservoir. The invention also relates to a method of operating a vibrating machine.

BACKGROUND OF THE INVENTION

In vibrating machines, such as screening machines or vibratory conveyors, having a first machine part that vibrates when in operation, the machine part is supported on springs. To minimize the transfer of dynamic loads onto the second machine part, which is connected to the installation area of the vibrating machine, and onto the substructure forming the installation area, a natural frequency is selected for the bearing device that is as low as possible and lies below the operating frequency of the first vibratory machine part. The vibrating machine may also be designed without a second, non-vibratory machine part. In that case, the vibratory machine part may be positioned on a stationary machine foundation such as a concrete foundation, with the bearing device situated in between.

During startup and rundown of the vibrating machine, due to the large masses involved and the large inertia of the vibrating first vibratory machine part, the passing through the natural frequency of the resilient bearing device is relatively slow. This results in large displacements of the first vibratory machine part and in correspondingly high dynamic loads. Here the vibrating machine with the bearing device and surrounding structures on the installation area are subject to heavy loads. Helical compression springs of steel or air springs are generally used in the bearing device. However, their natural damping is disadvantageously low and therefore technically not usable for avoiding the large displacements of the first vibratory machine part during startup and rundown of the vibrating machine. The degree of damping, also known as Lehr's damping ratio, is approximately 0.009 or 0.9% in steel springs and approximately 0.012 or 1.2% in conventional air springs. Both degrees of damping are inadequate for effective damping and avoidance of the large displacements of the first vibratory machine part during startup and rundown of the vibrating machine.

Various solutions are known in relevant practice that are intended to minimize unwanted resonant vibrations in the first machine part of the vibrating machine during startup and rundown. One solution is to limit the resonance by strongly accelerating and decelerating the rotary speed of the vibratory drive. However, due to the generally large inertia of the vibratory drive, this solution is only effective to a limited degree.

The use of fluid dampers makes sense in only a few cases. The disadvantage here is that fluid dampers continue damping during operation, which is inefficient from an energetic point of view and is accompanied by low isolation in operation. It has also been found that the lifetime of fluid dampers under ordinary ambient conditions of vibrating machines is unsatisfactory.

In practice there is widespread use of rubber elements to support the first vibratory machine part, however, this type of support is disadvantageously limited to low vibration amplitudes. The natural damping by rubber elements is adequate at low displacement rates. However, the natural frequency or resonant frequency of a rubber element support is relatively high at 6 to 9 Hz, with the result that acceptable degrees of isolation are only achieved in vibrating machines with operating frequencies of approximately 16 Hz and higher. Thus, in addition to the vibration amplitude being limited, the use is also restricted to vibrating machines with a high operating frequency.

Two-mass systems are used in large vibrating machines and/or in the case of high demands being made on isolation from the environment. Absorption effects reduce the forces acting upon the installation area and the environment during startup and rundown of the vibrating machine. However, the large displacement of the first vibratory machine part of the vibrating machine is not prevented by a structure of this kind. Since the additional mass of the two-mass system must amount to at least one-half, but ideally two to three times the mass of the vibrating machine in order to obtain an effective result, and since the structure of the two-mass system impedes access to the vibrating machine, this solution entails disadvantages concerning economic efficiency and maintainability of the vibrating machine.

The document DE 23 57 838 A1 describes a vibration-isolating bearing system for a machine, with a combination of rubber or metal springs associated with respective air springs. The air spring is shown in FIG. 3 of this document and explained in the corresponding description of the drawings. According to this document, the air spring possesses a first air chamber formed by an elastic bellows and a second air chamber formed by rigid wall sections. The air chambers fluidically communicate with one another via a "small opening", i.e., a throttle, in a wall section separating the chambers. The pressure in the air springs can be set and adjusted with pressure regulators via a duct or conduits.

The document EP 3 034 905 A1 shows a spring system comprised of an air spring system and a mechanical spring system. The air springs are equipped with pressure sensors that deliver measuring signals to a control and regulating unit. The control and regulating unit sets the air pressure in each air spring via adjustable valves, ideally in such a way that the level of the load is kept constant in operation. The springs of the mechanical spring system serve to absorb the larger base load; the springs of the air spring system serve only to accommodate the smaller load changes to be expected. A viscosity damping system with hydraulic dampers is provided to damp the spring system.

The document DE 42 33 212 A1 shows a spring system for isolating machine parts and measuring devices from a base, the spring system in this case serving to isolate the machine parts or measuring devices from vibrations acting on them from the surrounding area. The stiffness of the spring system can be switched from "hard" to "soft" and/or different magnitudes of damping can be implemented here.

FIG. 1 of this document shows an air spring having a first chamber subjected to the load and delimited by a bellows, and a second chamber connected via a throttle to the first chamber. The throttle is not adjustable and the different stiffnesses are brought about by at least one additionally connectable mechanical or fluid spring.

The document WO 03/089806 A1 shows an isolating spring and a spring bearing system to bear a load, capable of working in a first mode and in a second mode, and comprising an air spring connected to a load-bearing shaft and a hydraulic damping element having a first chamber and a second chamber separated by a piston connected to the load-bearing shaft. A hydraulic line has a valve connected to one end. The first chamber and the other end of the hydraulic line are connected to the second chamber. A vibration detector is connected to the valve to actuate the valve when abnormal vibrations occur. In a first operating mode the load is rigidly attached to the ground via a load path through the hydraulic damping element. In a second mode the load is isolated by the air spring and is damped by the hydraulic damping element.

The document DE 20 2012 003 315 U1 shows a screening machine for classifying or processing gravel, sand, or other bulk material, comprising a drive to generate a shaking motion, with the screening machine being positioned on at least one air bellows. In addition, a device for filling the air bellows is preferably provided, by which the pressure in individual air bellows is adjustable to different levels. The screening machine may include an open-loop or closed-loop control by which the pressure in at least one air bellows can be varied automatically during operation of the screening machine. Furthermore, this screening machine preferably has no brake for braking the machine. Even though the working height on the one hand and the tilting of the screening machine on the other hand can be varied by selecting the air pressure in the air bellows, the large displacements of the vibrating machine part occurring during startup and rundown of the machine cannot be effectively limited in this known screening machine, due to the low degree of damping of the air bellows. This applies especially if no brake is provided to brake the screening machine, as the document expressly indicates as being preferred. However, the document does not divulge how such a brake would be designed if a brake were to be provided after all to brake the screening machine.

The document DE 24 27 907 C2 describes a vibrating machine of the type given above, such as a vibratory conveyor or other vibrating device for conveying material or to classify, mix or sort materials. The vibrating machine comprises a first machine part mounted on suspension air springs and caused to vibrate by eccentric weights attached to a shaft that is bearing-mounted on the first machine part. The shaft is arranged near the center of gravity of the first machine part and is driven by a motor situated on the first machine part. The afore-mentioned suspension air springs here serve solely to support the first machine part in a manner that permits its vibration. However, this document is primarily concerned with a device for setting the vibrations of the vibration-driven machine part. For this purpose, at least one separate vibration system is arranged on the first vibration-driven machine part. This system delivers linear vibrations with adjustable amplitude and frequency in such a way that the vibrations of the first machine part are damped or amplified in specific directions. Preferably at least two separate vibration systems are arranged at different angles on the first machine part and produce linear vibrations in different directions. Each vibration system preferably includes an oscillating mass movably held on the first machine part and one vibration-system air spring each on the opposite sides of the oscillating mass. Each vibration system here consists of two separate oscillating masses with vibration-system air springs on their opposite sides. The air pressure can be adjusted in the vibration-system air springs of the device to set the vibrations of the vibration-driven machine part. With regard to the suspension air springs this document merely discloses that damage could result from releasing air from the suspension air springs and that for this reason they are monitored by a pressure switch provided to stop the motor if there is a drop in the inflation pressure in the suspension air springs.

The vibrating machine known from the document DE 24 27 907 C2 has an obviously costly and complicated technical structure, on the one hand with suspension air springs on which the machine part vibrating in operation is mounted, and on the other hand with vibratory-system air springs and interacting oscillating masses which are part of the device for setting the vibrations of the vibration-driven machine part. This document does not address the problems concerning resonant vibration of the first machine part vibrating in operation, during the startup and rundown of the vibrating machine.

The document DE 20 2015 106 653 U1 shows a screening machine for sorting bulk materials by size, comprising a sieve box provided with at least one screening surface for screening bulk materials, and a drive unit by which the sieve box is caused to vibrate, wherein the sieve box has at least one support section by which it is mounted on a base via at least one suspension element utilizing the compressibility of gases, and wherein the at least one suspension element is provided with a shutoff valve apparatus to prevent a sudden escape of gas from the suspension element. The suspension element in this case is preferably formed by at least one air bellows, and the at least one air bellows is connected to an air supply line. It is also preferably provided that the at least one air spring bellows has a shutoff valve apparatus comprised of a preferably spring-biased shutoff valve provided on the air inlet side, to automatically prevent the escape of air from the air spring bellows into the air supply line in the event that the pressure of the air flowing into the bellows falls below a specified level. The risk of damage in the event of a leak in the gas inlet line of the suspension elements is to be minimized in that, if such a leak occurs, gas is automatically prevented from escaping from the suspension element, and the functionality of the suspension element is maintained at least over a period of time within which the screening machine can be brought controlled to a standstill. This document does not address the problems of avoiding or mitigating unwanted resonant vibrations in the first machine part during startup and rundown of the screening machine.

SUMMARY OF THE INVENTION

Therefore, it is an object of the present invention to provide a vibrating machine with a bearing device and a method of operating a vibrating machine which are capable, on the one hand, of avoiding or at least substantially reducing unwanted resonant vibrations in the first machine part during startup and rundown of the vibrating machine, and which are capable, on the other hand, of avoiding unwanted vibration damping of the second vibratory machine part in ongoing operation, i.e., between the startup and the rundown of the vibrating machine.

According to the invention, the first part of the object, referring to the bearing device, is accomplished with a bearing device of the type described above, that is characterized in that the bearing device with the first vibratory machine part has a resonant or natural frequency that is lower than an operating frequency of the vibrating machine; that the bearing device has a frequency-dependent lower stiffness level with high damping at low frequencies, a vibrating stiffness level with low damping at higher frequencies, and a transition zone lying in between at a transitional frequency; and that the/each throttle is dimensioned in such a way that the transitional frequency is close to, preferably slightly above, the resonant or natural frequency.

The particular advantage of the invention resides in the fact that an increased displacement of the vibrating second machine part is prevented or at least markedly reduced during the startup and rundown of the vibrating machine and the inevitably occurring sweep through the natural frequency of the bearing device. This is accomplished by the damping effected by the compressed air reservoir fluidically connected to the air spring and by the throttle installed in the fluidic connection and connected between the air spring and the compressed air reservoir. The bearing device according to the invention can also be advantageously used at high vibration amplitudes such as 20 mm, and is essentially wear-free.

A frequency-dependent, dynamic stiffness and damping of the bearing device of the vibrating machine can be achieved with the throttle. The dynamic stiffness exhibits a pronounced increase with rising frequency until an upper stiffness level with low damping is reached. The behavior in this case corresponds to that of an individual, stiff air spring. The lower stiffness level with large damping results from artificially enlarging the volume of the air spring by adding the volume of the compressed air reservoir. A transition zone in which the bearing device is increasingly stiffened lies between the upper and lower stiffness levels. Hence a transitional frequency can be determined from this at the turning point of the curve, which describes the point in time from which the additional volume in the compressed air reservoir is gradually decoupled from the air spring. Advantageously, the coupling and decoupling are performed automatically by physical effects without the necessity of active control of the throttle or other components of the bearing device. The decoupling already takes place due to the fact that at high frequencies and with a throttle having a correspondingly dimensioned throughput cross-section, the air is not given sufficient time to balance out the pressure between the air spring and the additional volume in the compressed air reservoir. Accordingly, the damping drops to a negligible level after decoupling in operation of the relevant vibrating machine with a nominal rotary speed and does not negatively influence the energy efficiency of the vibrating machine. If a suitable throttle is selected, the transitional frequency lies close to, preferably slightly above, the resonant or natural frequency of the first vibratory machine part of the vibrating machine, whereby the maximum damping desired here is produced for this frequency range.

As simulations and practical trials have shown, two-digit degrees of damping, approaching 20%, are obtained when optimal parameters of the bearing device and particularly of the throttle cross-section are selected. By this means, there is a significant reduction in vibration amplitudes, i.e., excessive vibration during startup and rundown, of the vibratory machine part of the relevant vibrating machine during the resonance sweep and hence in the dynamic loads of the vibrating machine, the bearing device, and also of the surrounding area. As opposed to this, vibrating machines mounted on conventional air springs known from the prior art or on steel springs with equivalent damping properties have excessive vibrations amounting to a multiple of the stationary vibration amplitude.

The natural or resonant frequency of the bearing device of the vibrating machine according to the invention lies at an advantageously low level conditioned by its technical functioning principle; for example, in practice this would preferably be between approximately 1 and 3 Hz. Therefore, even with relatively slow vibrating machines, i.e., those running at a low operating frequency of down to approximately 8 Hz, for example, the distance between the natural or resonant frequency of the bearing device and the operating frequency of the vibrating machine is adequate. Hence, even at operating frequencies as low as 8 Hz, the vibration isolation is adequate.

The bearing device of the vibrating machine according to the invention thus represents a system of air-spring-and-damper unit that produces damping in a desired frequency range via physical, thermodynamic and fluid-dynamic effects by means of an air spring with an additional volume, connected through a throttle. The damping occurs through energy dissipation in the form of heat, which can be verified by measurements made using a thermal imaging camera on a bearing device according to the invention.

A first embodiment of the vibrating machine with bearing device provides that the throttle is not adjustable. This bearing device of the vibrating machine is distinguished by a technically especially simple and thus inexpensive design since a non-adjustable throttle contains no movable elements susceptible to wear and no additional active elements such as actuators. Nevertheless, the favorable features and advantages described above are already achieved in this technically simple bearing device of the vibrating machine.

An alternative further development of the vibrating machine with bearing device according to the invention provides that the throttle is adjustable. This enables the throughput cross-section of the throttle to be selected and varied, if necessary, in such a manner that the damping of the air spring or air springs lies at the maximum attainable level during the entire startup and rundown processes of the vibrating machine, and that the damping of the air spring or air springs is minimal during operation of the associated vibrating machine at its operating frequency, i.e., between the startup and rundown processes. It is possible to decisively influence the transitional frequency described above by adjusting the throttle cross-section. This is especially helpful in bearing devices for vibrating machines such as screening machines operable in different frequency ranges. In addition, here the transitional frequency and the maximum damping can be shifted along with increasing/dropping frequency during startup/rundown of the vibrating machine.

Furthermore, as proposed in the invention, the throttle can be switched between a restricting position and a non-restricting position as a function of a detected vibration frequency of the first vibratory machine part. In this embodiment of the vibrating machine with bearing device, the throttle takes up only two different positions, resulting in a technically simple and inexpensive solution.

As an alternative, the throttle may be variable either infinitely or in several steps between more or less open, restricting positions in which the air springs are damped and a non-restricting position, as a function of a detected vibrating frequency of the first vibratory machine part. In this way, with slightly greater technical effort a more differentiated and variable setting of the damping of the air spring or air springs of the vibrating machine becomes possible.

For the vibrating machine with bearing device the invention further provides that the non-restricting position of the throttle is its completely closed position in which the throttle blocks a fluidic connection between the air spring and the compressed air reservoir, or that the non-restricting position of the throttle is its completely open position in which an unrestricted fluidic connection with no damping of the air spring exists between the air spring and the compressed air reservoir. In the first alternative given here, the natural or resonant frequency of the bearing device is determined solely by the air volume of the air spring. In the second alternative, the additional volume of the compressed air reservoir added to the air volume of the air spring lowers the natural or resonant frequency of the bearing device to a lower frequency. This is advantageous particularly in bearing devices for vibrating machines with a low operating frequency. The natural or resonant frequency of the bearing device can be decisively influenced by the size of the additional volume, as will be described in greater detail below.

The aforementioned unrestricted fluidic connection between the air spring and the compressed air reservoir may also extend parallel to the throttle instead of through it via an additional bypass duct of sufficiently large cross section, such as a valve, the bypass duct being switchable between the closed and the open position and connected in parallel to the throttle.

In an additional, concrete embodiment of the vibrating machine with bearing device, the invention provides that in the case of vibration frequencies occurring during startup and rundown of the vibrating machine, the throttle assumes a restricting position in which the air spring is damped, and during operation of the vibrating machine at its operating frequency the throttle assumes a non-restricting, completely open or closed position with no damping of the air spring in either case. Not only with the throttle completely open, but also with it closed, the throttle does not damp the air springs. Instead they exhibit only their own negligible natural damping. As a result, in ongoing operation of the vibrating machine at its operating frequency no undesired vibration damping of the vibratory machine part of the vibrating machine occurs.

In order for the vibration of the first vibratory machine part to be adequately isolated and decoupled from the second, non-vibratory machine part and from the installation area of the vibrating machine during operation of the vibrating machine, it is proposed that the bearing device of the vibrating machine has a natural frequency that is a maximum of one-half as large as an operating frequency of the first vibratory machine part of the vibrating machine.

Another possibility for purposefully influencing the resilient behavior of the bearing device of the vibrating machine comprises connecting a compressed air source preferably to the compressed air reservoir and/or to the air spring and to set a specifiable, variable basic air pressure in the compressed air reservoir and in the air spring by means of the compressed air source.

To obtain as simple and cost-effective a structure of the vibrating machine as possible, the vibrating machine preferably has one air spring per support point.

Here, the air springs of all support points of the vibrating machine are preferably aligned in the same manner, ideally vertically. In this way especially the large static loads exerted on the bearing device by the large mass of the vibratory machine part are well absorbed.

In the case of especially large static and dynamic loads on the bearing device of the vibrating machine, the bearing device may have two air springs arranged as a pair for each support point, over which the loads are distributed. Of course, it is fundamentally also possible to provide more than two air springs per support point if necessary or practical.

Air springs have a substantially lower resilience rate in their transverse direction than longitudinally. Hence, they also have a lower natural frequency in their transverse direction than longitudinally. In addition, charging the air spring in its transverse direction is accompanied by a lower volume change in the air spring than is the case with longitudinal charging. For example, if all air springs of the vibrating machine are in a standing arrangement, i.e., with a vertical longitudinal direction, then the damping of a horizontal movement of the vibratory machine part of the vibrating machine is, disadvantageously, not as efficient as in the vertical direction. To avoid this disadvantage, the invention provides that the two air springs of each pair are set in place against one another at an angle of up to 90°. Due to placing the air springs against one another by up to 90°, horizontal movements of the vibratory machine part of the vibrating machine also cause a load to be exerted on the air spring or springs in their longitudinal direction. In this way vibrations occurring during the startup and rundown of the associated vibrating machine mounted on the bearing device can be more efficiently damped and reduced independently of direction.

To ensure a spatially symmetrical damping effect of the bearing device of the vibrating machine, it is useful to align the two air springs of each pair symmetrically to one another at uniform angles of up to 45° to the vertical.

An advantageously simple embodiment of a vibrating machine with a bearing device having several air springs and with relatively few individual parts is achieved if all air springs are associated with one single common compressed air reservoir and one single common throttle. On the other hand, however, a disadvantage of this could be that longer air ducts between the air springs and the throttle and compressed air reservoir are required if the air springs are spaced relatively far apart from one another.

In an alternative embodiment of the vibrating machine with a bearing device having several air springs, each air spring is associated with its own compressed air reservoir and its own throttle. This particularly makes it possible to individually influence the resilience and damping properties of the individual air springs.

For the above-mentioned embodiment of the vibrating machine with a bearing device having air springs arranged in pairs, it may serve the purpose to assign one compressed air reservoir and one common throttle to each pair of two air springs.

Another advantage of the vibrating machine with a bearing device having two or even more air springs per support point is that in the event of damage to an air spring accompanied by escaping compressed air there is still at least one other functional air spring at the relevant support point. Further damage to the bearing device and to the vibrating machine up until their emergency shutdown are avoided in this way.

The/each adjustable throttle of the bearing device of the vibrating machine can be different in design; ideally, the/each adjustable throttle is formed by a throttle valve with an adjustable cross-section or by a throttle line with an adjustable through-flow length, such as a tube with a narrow cross-section.

Further, for the vibrating machine with bearing device according to the invention, it is provided that the/each compressed air reservoir has a variable, settable volume or that one or more additional compressed air reservoirs fluidically connectable to and separable from the/each compressed air reservoir is or are associated with the/each compressed air reservoir. With the variable size of the additional volume provided by the compressed air reservoir and where applicable by the additional compressed air reservoirs in addition to the volume of the air spring, the natural frequency of the bearing device can be set and adjusted. Thus, for example, the stiffness of the bearing device can be reduced by enlarging the additional volume, resulting in lower dynamic loads.

A further embodiment of the vibrating machine of the invention provides that a control unit is associated with the vibrating machine, whereby the current vibration frequency of the first vibratory machine part is detectable and whereby the/each throttle is adjustable as a function of the detected vibration frequency between a restricting position during a startup and rundown of the vibrating machine at vibration frequencies below the operating frequency, and an open or closed position with no or only slight restriction in either case during the ongoing operation of the vibrating machine at its operating frequency.

To solve the second part of the object of the invention, relating to the method of operating a vibrating machine, the invention proposes a method characterized in that a current existing vibration frequency of the first vibratory machine part is detected and that the/each throttle is adjusted as a function of the detected vibration frequency between a restricting position with the/each air spring being damped during a startup and rundown of the vibrating machine at vibration frequencies below the operating frequency, and a non-restricting open or a closed position, with the air spring in either case not being damped during the operation of the vibrating machine at its operating frequency. With this method of operating a vibrating machine it becomes possible to prevent or at least substantially reduce not only unwanted resonant vibrations in the first vibratory machine part during startup and rundown of the vibrating machine, but also unwanted vibration damping of the second vibratory machine part during operation of the vibrating machine at operating frequency. Harmful dynamic loads of the vibrating machine are reduced by this means, and a more economical mode of operation of the vibrating machine with lower exertion of driving power becomes possible, since no energy is wasted as a result of undesired damping in ongoing operation of the vibrating machine at operating frequency.

BRIEF DESCRIPTION OF THE DRAWINGS

Embodiments of the invention are explained below on the basis of the drawings.

FIG. 11 shows a diagram with two curves depicting the die-out of a vibrating machine after being switched off, with one curve relating to the bearing device according to the invention and the other relating to a conventional bearing device.

In the following description of the drawings the same parts in the different figures are always given the same reference numbers so that not all reference numbers have to be explained again for each drawing.

DETAILED DESCRIPTION OF THE PREFERRED EMBODIMENTS

Figure 1:
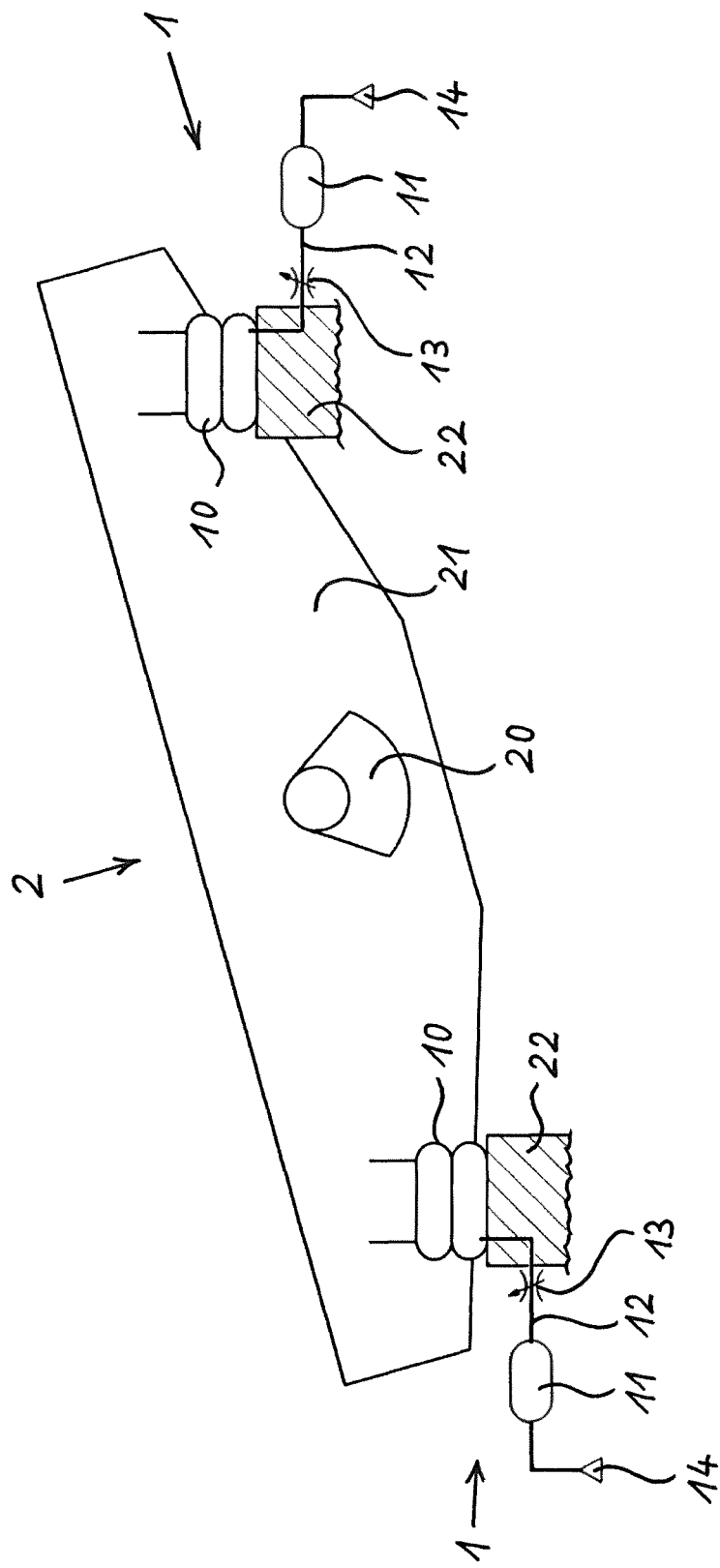
FIG. 1 shows a schematic side view of a vibrating machine with a first bearing device.

FIG. 1 shows a schematic drawing of a vibrating machine 2, such as a screening machine or vibratory conveyor, having a first bearing device 1. The vibrating machine 2 has a first machine part 21 that vibrates in operation, a second machine part 22 connected to an installation surface of the vibrating machine 2 and a vibration drive 20 such as an eccentric mass set into vibration by a rotary drive, as indicated in FIG. 1 and as is known per se. A screening or conveyor surface is hidden behind the visible part of the first machine part 21 in FIG. 1 and is likewise known per se.

A resilient bearing device 1 is arranged between the machine parts 21, 22 to make the vibration of the first machine part 21 possible relative to the second machine part 22 and to decouple the vibrations of the first machine part 21 from the second machine part 22 and from the installation surface and the environment.

The bearing device 1 has one air spring 10 per support point. Two front support points with one air spring 10 each are visible in FIG. 1; two additional, rear support points, also with one air spring 10 each, lie hidden on the rear side of the vibrating machine 2 in FIG. 1. Thus, in the embodiment shown the vibratory machine part 21 is mounted at four support points on one air spring each 10, making a total of four air springs 10 arranged at the corners of a rectangle when viewed from above. A different number and arrangement of support points is also possible.

The air springs 10 of all support points have the same alignment, in the present case vertical.

The bearing device 1 also has one compressed air reservoir 11 per air spring 10, fluidically connected to the air spring 10 through a duct 12. In each case an adjustable throttle 13 is switched into the duct 12 between the air spring 10 and the associated compressed air reservoir 11; in the present case it has a variable throughput cross-section. For this purpose, the throttle 13 is designed as an adjustable throttle valve, for example.

A compressed air source 14, such as a compressed air connection to a compressed air system or a compressor, is connected to each compressed air reservoir 11. A specifiable, variable basic air pressure can be set by means of the compressed air source 14 in the associated compressed air reservoir 11 and in the associated air spring 10. By this means, the resilient properties of the air springs can be suitably adjusted as needed in concrete deployment situations.

Each throttle 13 can be switched between a restricting position and a non-restricting position as a function of a detected vibration frequency of the first vibratory machine part 21; it is preferably infinitely variable or variable in several steps between more or less open restricting positions on the one hand, in which the air springs 10 are damped, and a non-restricting position on the other.

The non-restricting position of the throttle 13 is either its completely open position, in which there is an unrestricted fluidic connection between the air spring 10 and the compressed air reservoir 11 with no damping of the air spring, or its completely closed position, in which the throttle 13 or alternatively an additional valve blocks a fluidic connection between the air spring 10 and the compressed air reservoir 11. In the first alternative, the natural or resonant frequency of the air springs 10 and hence of the bearing device 1 is determined solely by the air volume of the air springs 10. In the second alternative, the natural or resonant frequency of the air springs 10 and hence of the bearing device 1 is shifted to a lower frequency by the additional volume of the compressed air reservoir 11 added to the air volume of the air springs 10.

In the case of vibration frequencies of the vibrating machine 2 occurring during startup and rundown of the vibrating machine 2, the throttles 13 assume a restricting position in which the air spring 10 is damped, whereas in operation of the vibrating machine 2 at its operating frequency they assume a non-restricting, completely open or closed position, with the air springs 10 not being damped in either case.

To reliably prevent unwanted excitation of the air springs 10 and the bearing device 1 to vibrate at their natural or resonant frequency during operation of the vibrating machine 2 at its operating frequency, the bearing device 1 has a natural frequency that is at most one-half as high as the operating frequency of the first vibratory machine part 21 of the vibrating machine 2. An advantageously low natural frequency of the bearing device 1 is already achieved due to technical and physical aspects through utilization of the air springs 10 in the bearing device 1. This natural frequency can be further lowered by enlarging the effective air volume of the air springs 10 through the addition of the air volume of the compressed air reservoir 11 to the air springs' 10 own air volume.

Figure 2:
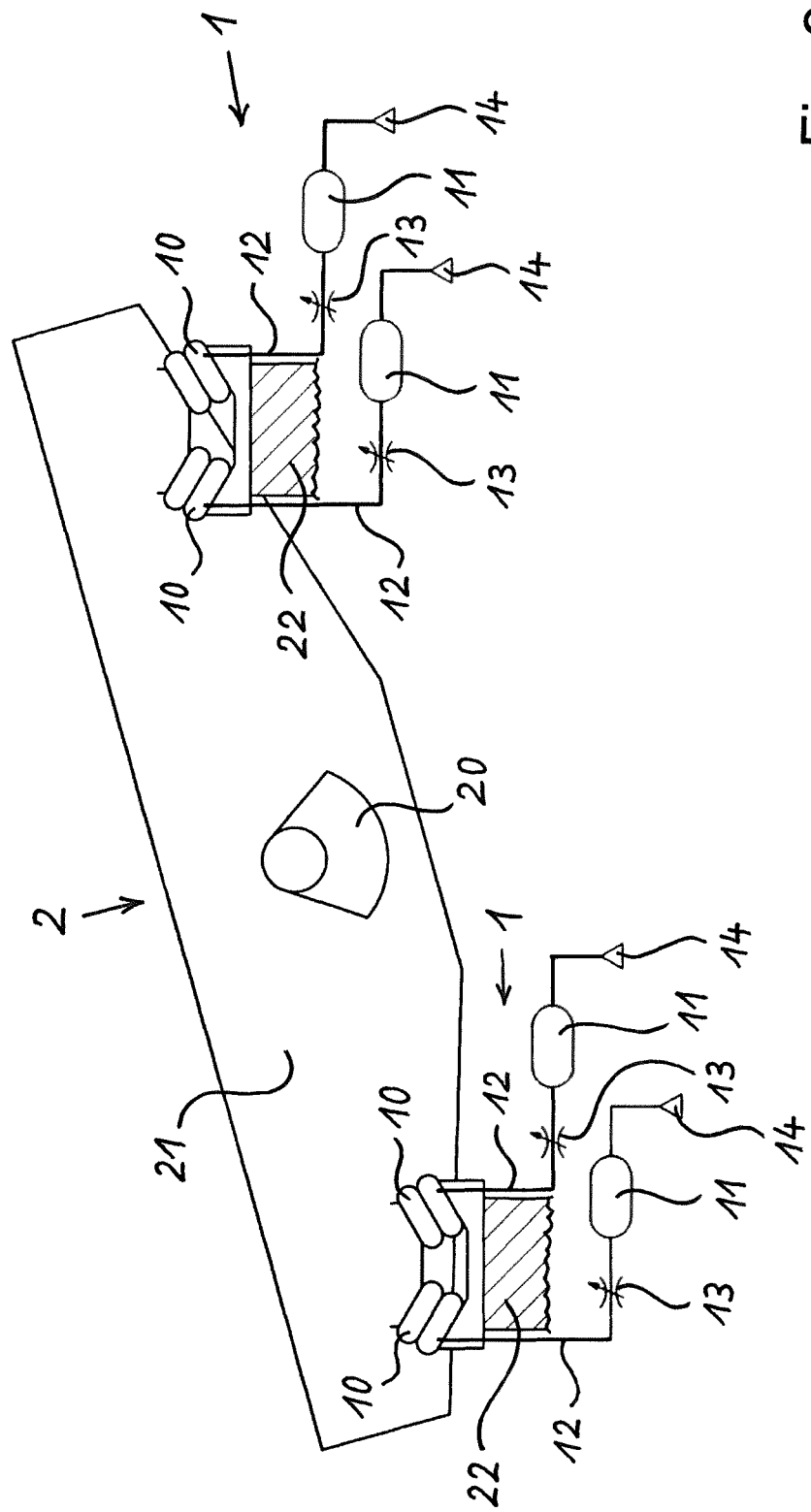
FIG. 2 shows a schematic side view of the vibrating machine with a second bearing device.

FIG. 2 shows a likewise schematic side view of the vibrating machine 2 with a second bearing device 1. The second bearing device 1 typically has two air springs 10 per support point, arranged as a pair. The two air springs 10 of each pair are placed at an angle to one another of up to 90°; the example shown has an angle of 60°. The two air springs 10 of each pair are aligned symmetrically to one another at the same angles of up to 45° to the vertical, in the example shown at an angle of 30° each. With this placement of the air springs 10 horizontal movements of the vibratory machine part 21 of the vibrating machine 2 also cause a load to be exerted on the air springs 10 in their longitudinal direction. This permits more efficient, non-directional vibration damping during the startup and rundown of the vibrating machine 2.

The adjustable throttle 13 may be designed in various ways. In the embodiments shown, the/each adjustable throttle 13 is formed by a throttle valve with a variable throughput cross-section. As an alternative, the/each adjustable throttle 13 may also be formed by a throttle line such as a tube with a narrow cross-section, that is adjustable in its flow length.

In both embodiments shown in FIGS. 1 and 2, each air spring 10 is associated with its own compressed air reservoir 11, its own throttle 13, and its own compressed air source 14.

Figure 3:
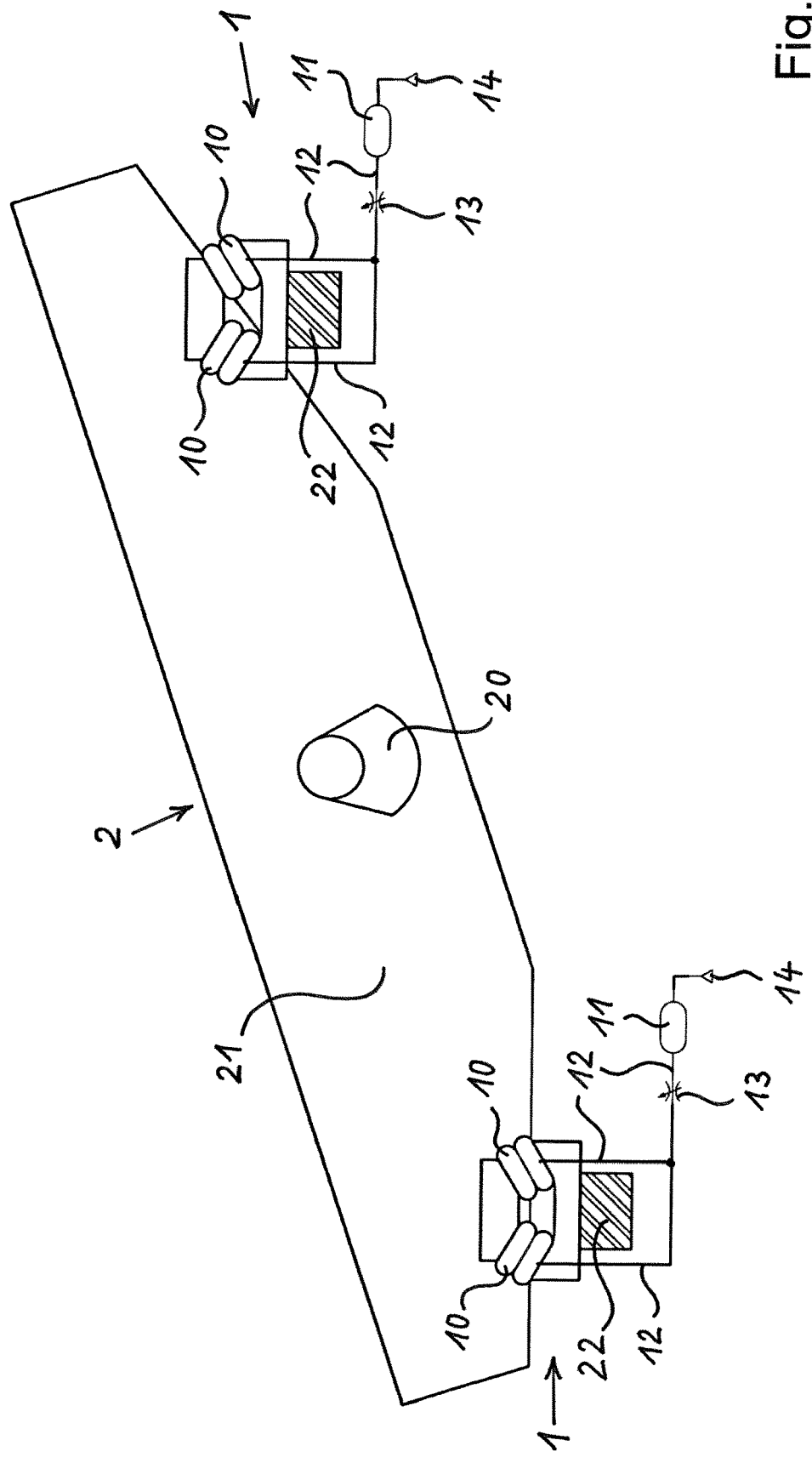
FIG. 3 shows a schematic side view of the vibrating machine with a third bearing device.

According to the embodiment shown in FIG. 3, it is also possible for each two air springs 10 of each pair in the bearing device 1 to have one common compressed air reservoir 11 and one common adjustable throttle 13 associated with them. In this embodiment the compressed air duct 12 that connects the compressed air reservoir 11 to the two associated air springs 10 and has the adjustable throttle 13 switched into it splits into two branches between the throttle 13 and the respective two relevant air springs 10. Each compressed air reservoir 11 is connected to a compressed air source 14. Concerning the other parts depicted in FIG. 3 and the function of the bearing device 1, attention is called to the preceding description of FIGS. 1 and 2.

Figure 4:
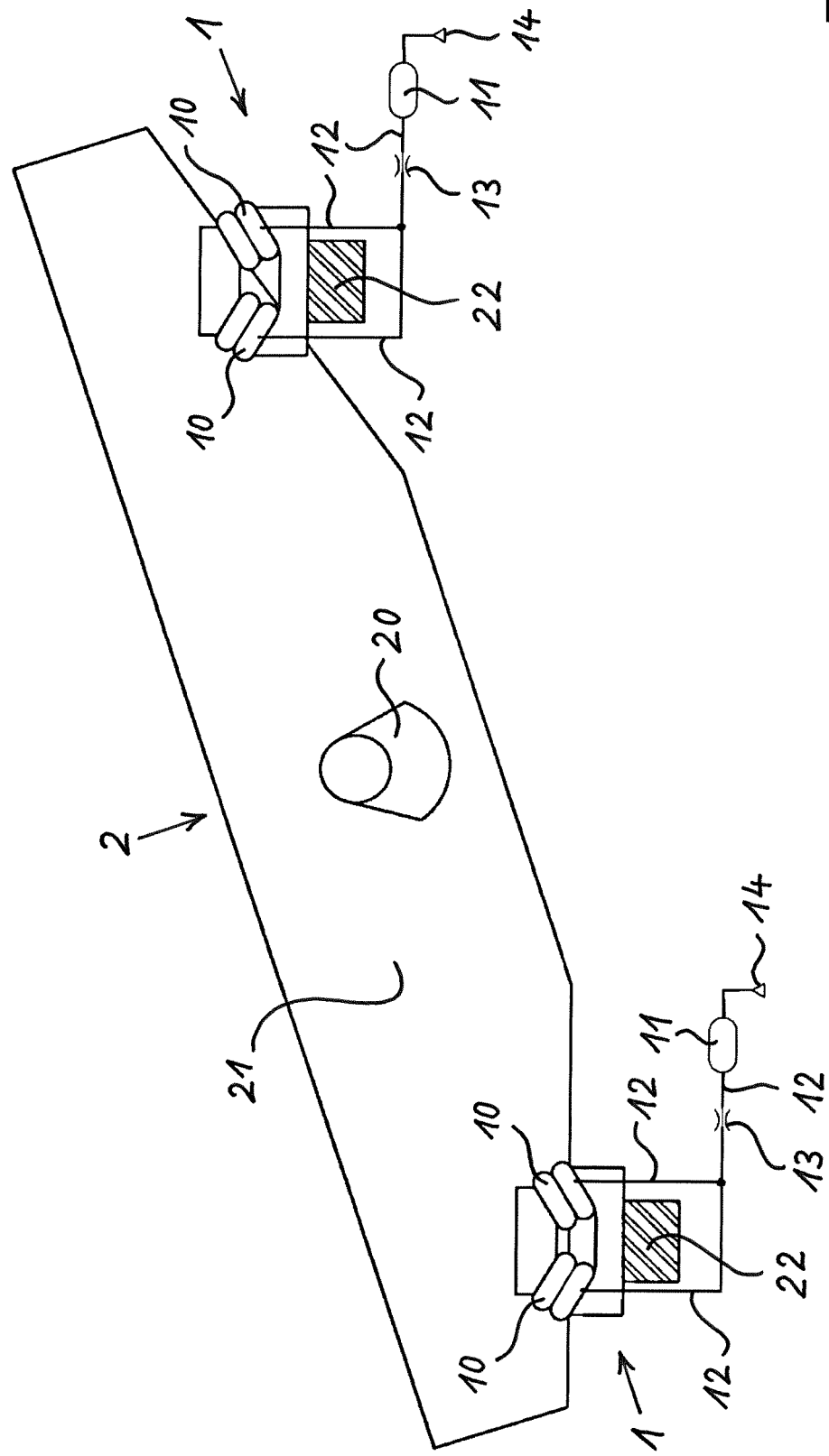
FIG. 4 shows a schematic view of the vibrating machine with a fourth bearing device.

As an alternative to the embodiments according to FIGS. 1 to 3, in the embodiment of FIG. 4 the throttles 13 of the bearing device 1 may also be non-adjustable throttles 13, i.e., throttles 13 with a specific fixed throughput cross-section. This bearing device 1 is distinguished by a technically especially simple and thus inexpensive design since a non-adjustable throttle 13 contains no movable elements susceptible to wear and no additional active elements such as actuators.

Nevertheless, the positive features and advantages described above are already achieved in this technically simple bearing device 1. A frequency-dependent, dynamic stiffness and damping of the bearing device 1 is also achieved with the non-adjustable throttle. The stiffness increases with increasing frequency up until an upper stiffness level with low damping is reached. The lower stiffness level with high damping is the result of the volume of the air springs 10 being artificially enlarged by the additional volume of the compressed air reservoir 11. A transition zone in which the bearing device 1 increasingly stiffens lies between the lower and upper stiffness levels. Here there is a transitional frequency range in which the additional volume in the compressed air reservoir 11 gradually decouples itself from the air springs 10. The decoupling and coupling take place here advantageously automatically through physical effects, namely, solely by the fact that at high frequencies and with a throttle 13 having a correspondingly dimensioned throughput cross-section, the air is not given sufficient time to balance out the pressure between the air springs 10 and the additional volume in the compressed air reservoir 11. Accordingly, the damping drops to a negligible level after decoupling in operation of the pertinent vibrating machine 2 with a nominal rotary speed and does not negatively affect the energy efficiency of the screening machine 2. If a suitable throttle is selected, the transitional frequency range lies close to, specifically slightly above, the resonant or natural frequency of the first vibratory machine part 21 of the vibrating machine 2, whereby the maximum damping desired here is produced for the resonant or natural frequency range that is swept in the startup and rundown of the vibrating machine 2.

If optimal parameters of the bearing device 1, and particularly of the cross-section of the throttle 13, are selected, two-digit degrees of damping approaching 20% are achieved in practice. By this means, there is a significant reduction in the vibration amplitudes of the vibratory machine part 21 of the relevant vibrating machine 2 during the resonance sweep, i.e., during startup and rundown of the vibrating machine 2. Hence, the dynamic loads on the vibrating machine 2, the bearing device 1, and also on the environment, are significantly reduced. The decay time of the vibrating machine 2 is also reduced.

Concerning the other parts of the bearing device 1 shown in FIG. 4, attention is called to the preceding description of FIGS. 1 and 2.

Figure 5:
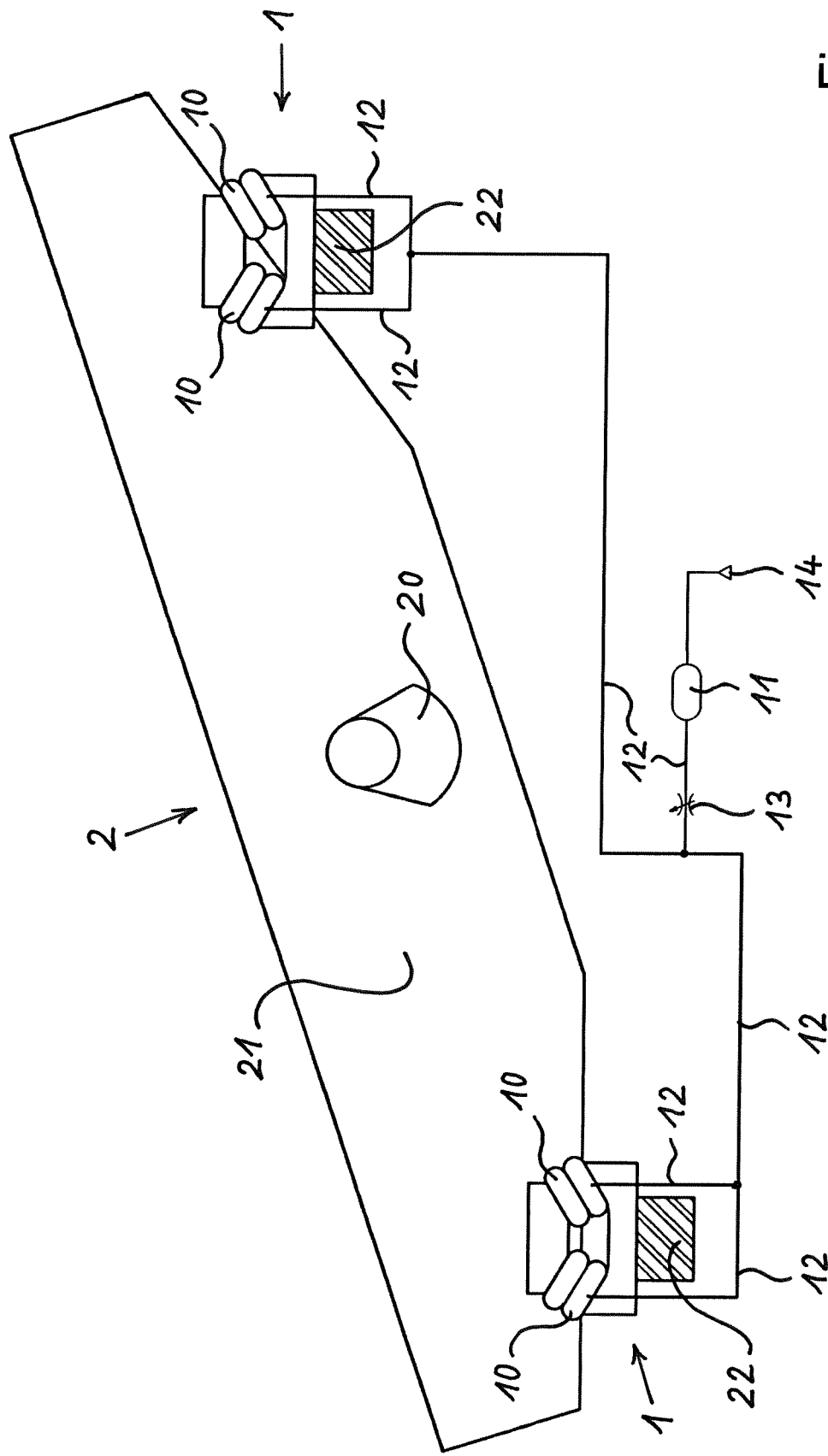
FIG. 5 shows a schematic side view of the vibrating machine with a fifth bearing device.

According to the embodiment shown in FIG. 5, one single common compressed air reservoir 11 and one single common throttle 13, in this case again adjustable, and one single compressed air source 14 may be provided for all air springs 10 of the bearing device 1 of the vibrating machine 2. The compressed air duct 12 that connects the compressed air reservoir 11 to the air springs 10 and has the adjustable throttle 13 switched into it splits in this version of the bearing device 1 between the throttle 13 and the pertinent air springs 10 into a plurality of branches corresponding to the number of air springs 10. Concerning the other parts shown in FIG. 5 and the function of the bearing device 1, attention is called to the preceding description of FIGS. 1 and 2. Selection of the bearing device design in this case is based especially on how many influencing factors are required or desirable in the pertinent practical application of the bearing device 1.

Figure 6:
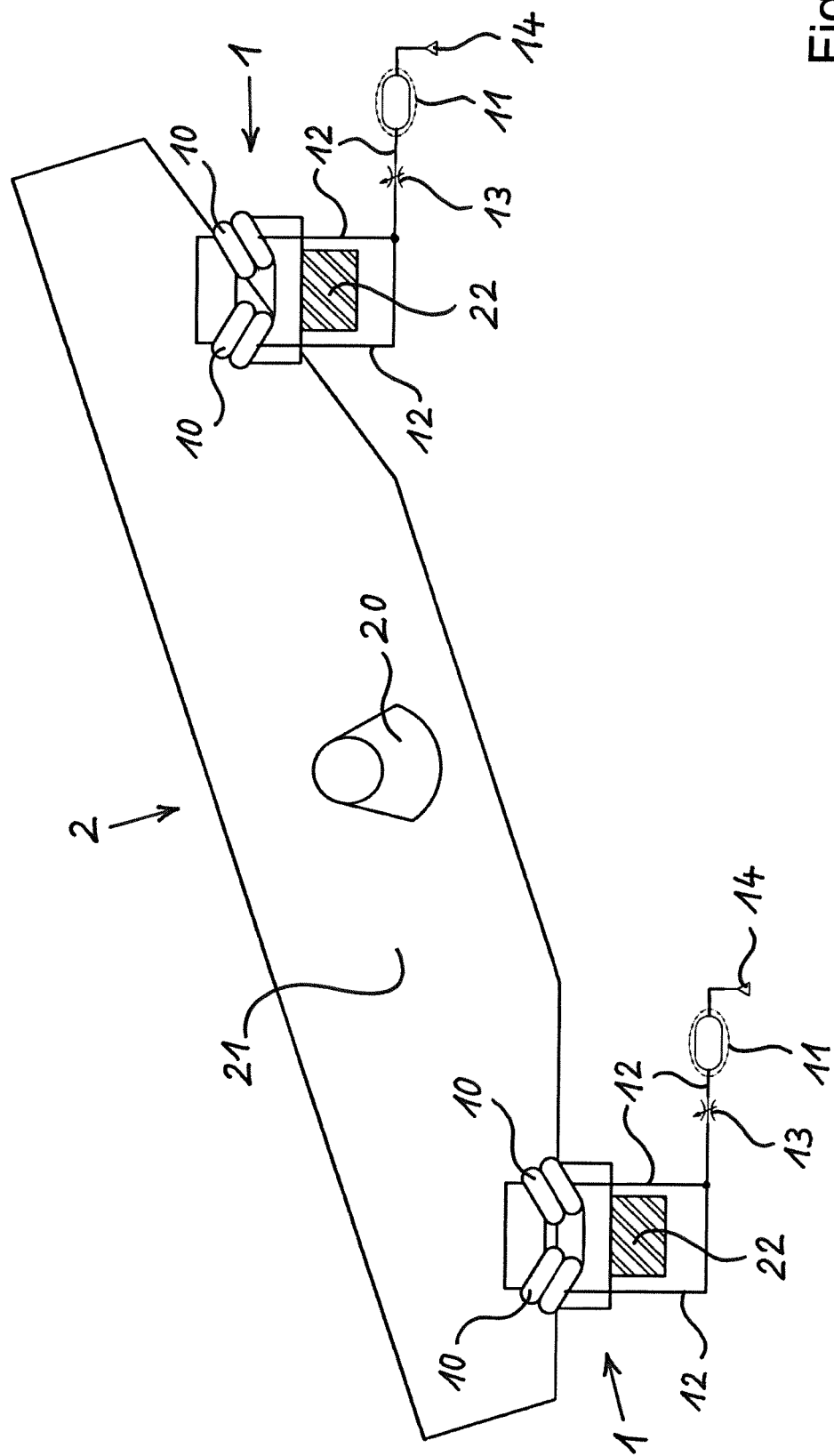
FIG. 6 shows a schematic side view of the vibrating machine with a sixth bearing device.

FIG. 6 shows the vibrating machine 2 with a bearing device 1 that has been modified once more and which, apart from the form of compressed air reservoir 11, coincides with the embodiment according to FIG. 3. Unlike the previously described embodiments, the compressed air reservoirs 11 do not have a fixed volume, but rather a variable one, as suggested in FIG. 6 by broken lines around the compressed air reservoirs 11. The natural frequency of the bearing device 1 can be set and adapted with the variable size of the additional volume that is made available by the volume of the compressed air reservoir 11 and added to the volume of the air springs 10. Accordingly, the stiffness of the bearing device 1 can be reduced, for instance by enlarging the additional volume, resulting in lower dynamic loads.

Concerning the other parts shown in FIG. 6 and the functionality of the bearing device 1, attention is called to the preceding description of FIGS. 1 and 2.

Figure 7:
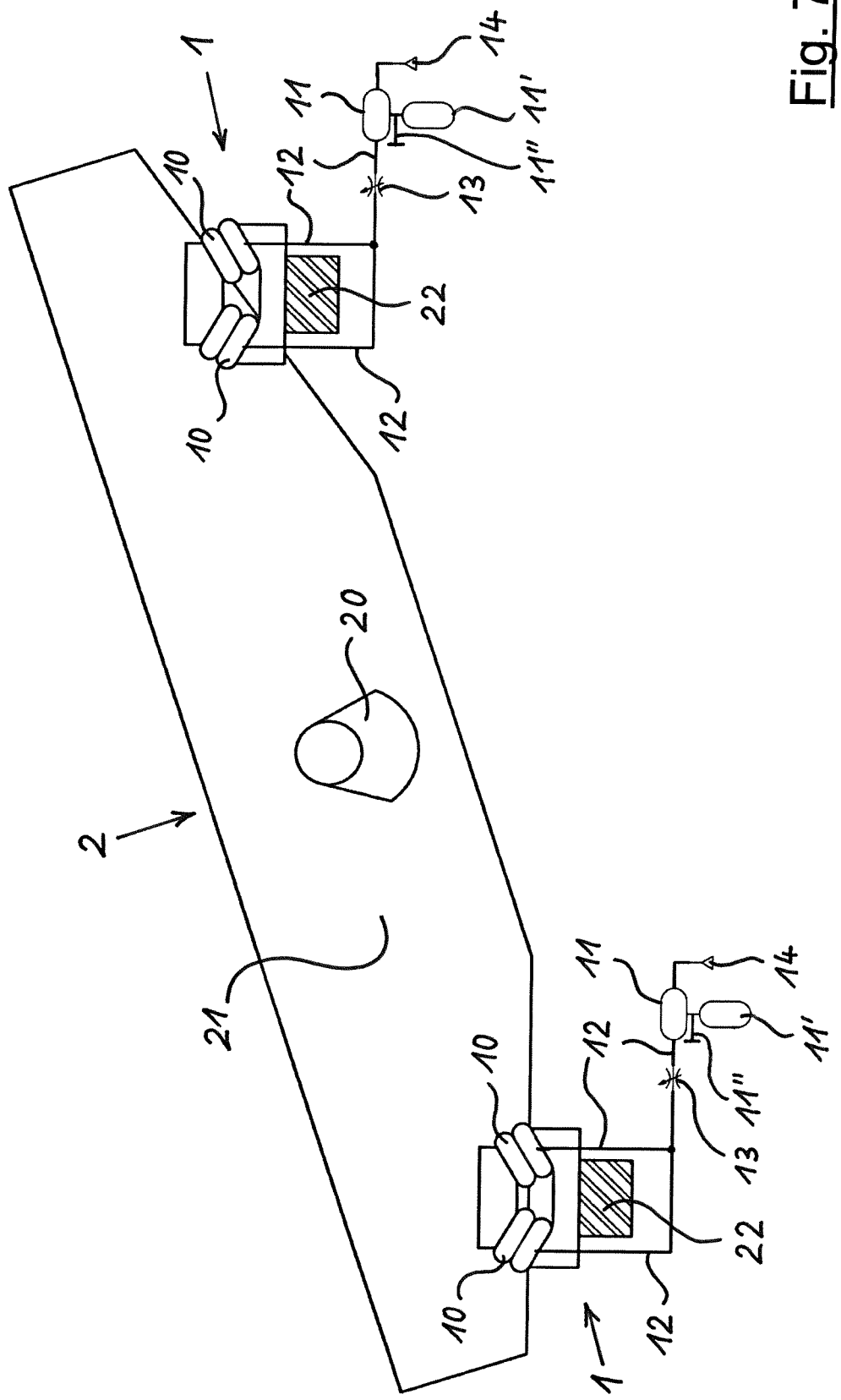
FIG. 7 shows a schematic side view of the vibrating machine with a seventh bearing device.

FIG. 7 shows the vibrating machine 2 with an additional bearing device 1, as an alternative to the embodiment according to FIG. 6. Each compressed air reservoir 11 here has a fixed volume. Associated with each compressed air reservoir 11 is an additional compressed air reservoir 11' adapted to be fluidically connected to and disconnected from the compressed air reservoir 11. A shutoff valve 11" to alternatively connect and disconnect the compressed air reservoir 11 and the additional compressed air reservoir 11' is connected to an air duct between the compressed air reservoir 11 and the associated additional compressed air reservoir 11'. The natural frequency of the bearing device 1 can also be set and adjusted with the resultant variable size of the additional volume provided by the volume of the compressed air reservoir 11 and of the additional compressed air reservoir 11' added to the volume of the air springs 10. Concerning the other parts of the bearing device 1 shown in FIG. 7, attention is called to the preceding description of FIGS. 1 and 2.

For practical purposes, the additional volume in the bearing devices 1 according to FIGS. 6 and 7 is preferably automatically set and/or switched in and/or out as a function of parameters determined on the vibrating machine 2, particularly the vibration frequency of the vibratory machine part 21.

Figure 8:
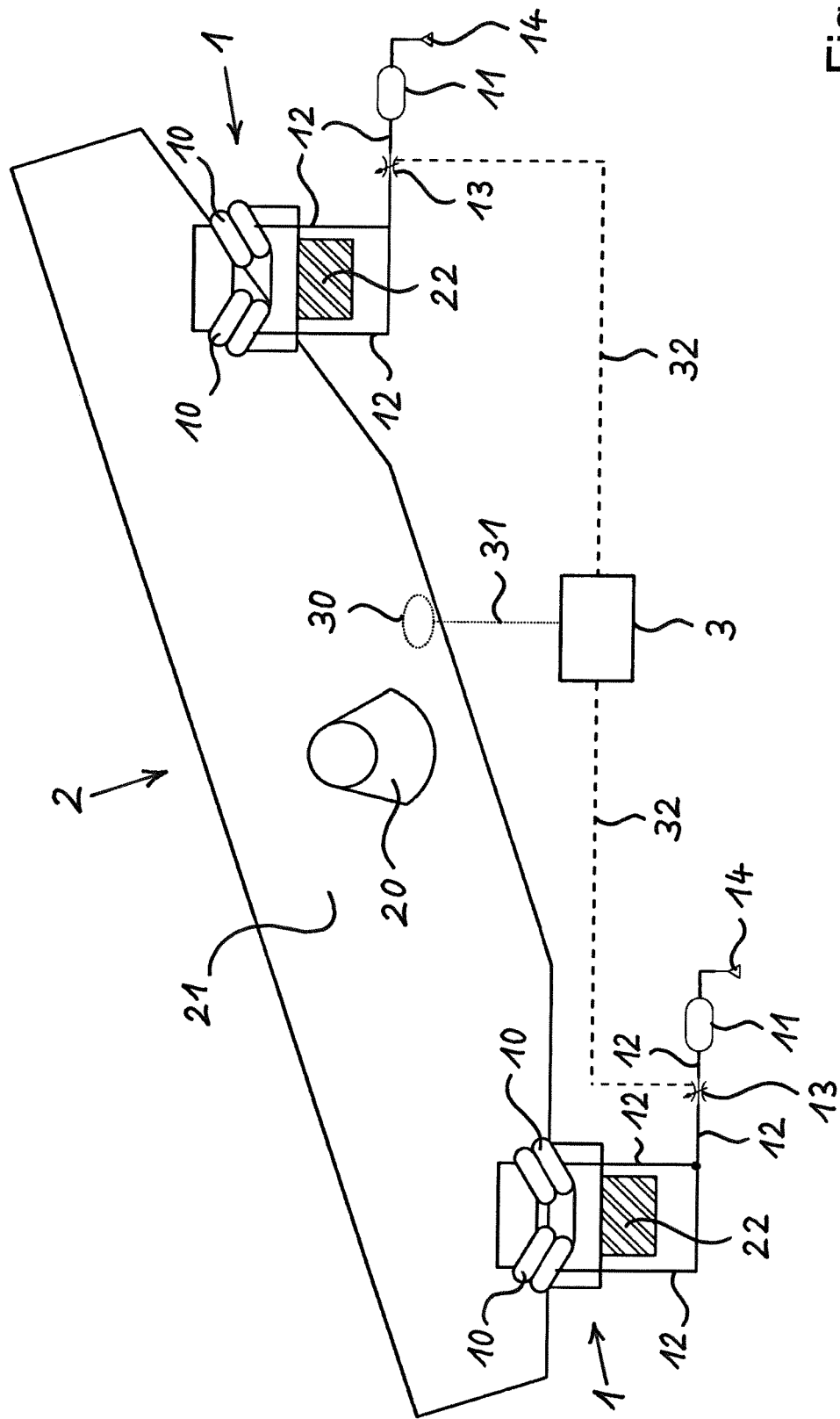
FIG. 8 shows a schematic side view of the vibrating machine with an eighth bearing device.

FIG. 8 shows the vibrating machine 2 with a bearing device 1 and an associated control unit 3 by which the current vibration frequency of the first vibratory machine part 21 can be detected, for instance with a vibration sensor 30 on the first machine part 21, and in which each adjustable throttle 13 is adjustable, as a function of the detected vibration frequency, between a restricting position during startup and rundown of the vibrating machine 2 at vibration frequencies below the operating frequency, and an open or closed position with no restriction or only slight restriction in either case during ongoing operation of the vibrating machine 2 at its operating frequency, which is greater than the vibration frequencies during the startup and rundown of the vibrating machine 2. For practical purposes, the adjustable throttles 13 are automatically remotely actuatable from the control unit 3, for instance via an electric motor or electromagnetically or in any other suitable manner. A measuring line 31 serves to transfer measured vibration frequency data from the vibration sensor 30 to the control unit 3. Control commands are transmitted from the control unit 3 to the adjustable throttles via a control line 32. Wireless transmission is also possible here as an alternative.

Furthermore, additional vibrating machine parameters can be detected and used for control purposes via the control unit 3 and by means of suitable additional sensors not shown separately in FIG. 8; examples of such parameters are the vibration amplitude of the vibratory machine part 21 or the air pressure in the air springs 10.

The operation of the vibrating machine 2 with bearing device 1 is then preferably such that a current vibration frequency of the first vibratory machine part 21 is detected, and that the/each throttle 13 is switched as a function of the detected vibration frequency between a restricting position with damping of the air springs 10 during startup and rundown of the vibrating machine 2 at vibration frequencies below the operating frequency, and a non-restricting, open or closed position with no damping of the/each air spring 10 in ongoing operation of the vibrating machine 2 at its operating frequency.

Figure 9:
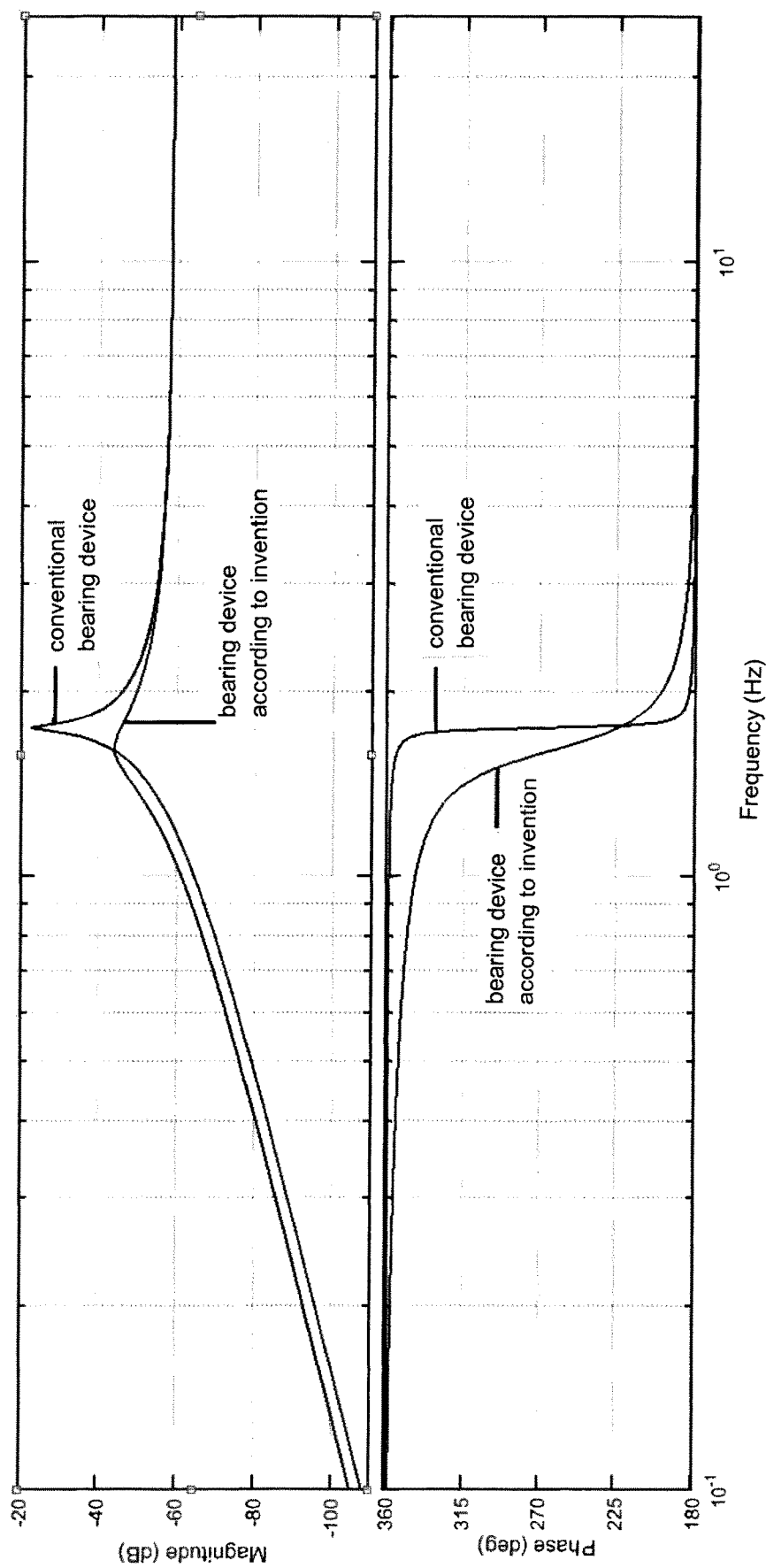
FIG. 9 is a so-called Bode diagram comparing the excessive vibration of a vibrating machine mounted on a conventional bearing device to that of a vibrating machine mounted on a bearing device according to the invention.

FIG. 9 shows a so-called Bode diagram comparing the excessive vibrations of a vibrating machine mounted on a conventional bearing device to those of a vibrating machine mounted on a bearing device according to the invention.

In the Bode diagram the magnitude and the phase are shown against the frequency. Therefore, these will be referred to as magnitude frequency response and phase frequency response. Thus, the bode diagram describes the relation between a harmonic excitation at the inlet and the associated output signal. This magnitude gain is depicted as usual as a logarithmic quantity in decibels [dB] and is defined as 20*log output/input dB. For orientation purposes it is mentioned here that an excess of 6 dB corresponds to a two-fold gain, 12 dB to a four-fold and 20 dB to a ten-fold gain.

In vibrating machines mounted on bearing devices with conventional air springs or steel springs known from the state of the art, theoretical excessive vibrations of approximately 36 dB can be determined in the Bode diagram as opposed to only approximately 9 dB in the bearing device of the invention. The dB values of the excessive vibrations here correspond to the differences between the magnitude in the higher frequency range at 10 Hz and more and the magnitude in the resonant or natural frequency range, in the present case slightly less than 2 Hz.

The pronounced damping can also be verified in measurements of the vibration amplitude or oscillation displacement in the resonance sweep. Here merely a three-fold excessive vibration amplitude or oscillation displacement can be verified in the bearing device of the invention as opposed to a seven to ten-fold excess in machines on conventional air springs or steel springs. In this connection FIG. 10 shows two schematic vibration diagrams in which the decay behavior of a vibrating machine mounted on a conventional bearing device is shown at the top of FIG. 10, compared to a vibrating machine mounted on a bearing device according to the invention and shown at the bottom of FIG. 10.

As illustrated by the comparison of the vibration diagrams, the decay time of the vibrating machine with a bearing device according to the invention is substantially reduced, due to its high degree of damping, which approaches 20% as opposed to a vibrating machine mounted on a conventional bearing device known from the state of the art. The bearing devices initially described above with air springs according to the state of the art have substantially longer decay times than the bearing device of the invention, as well as substantially smaller degrees of damping of only 5% or less. Therefore, the vibration isolation with the bearing device of the invention in the form of a system of an air-spring-and-damper unit is also measurably improved.

Figure 10:
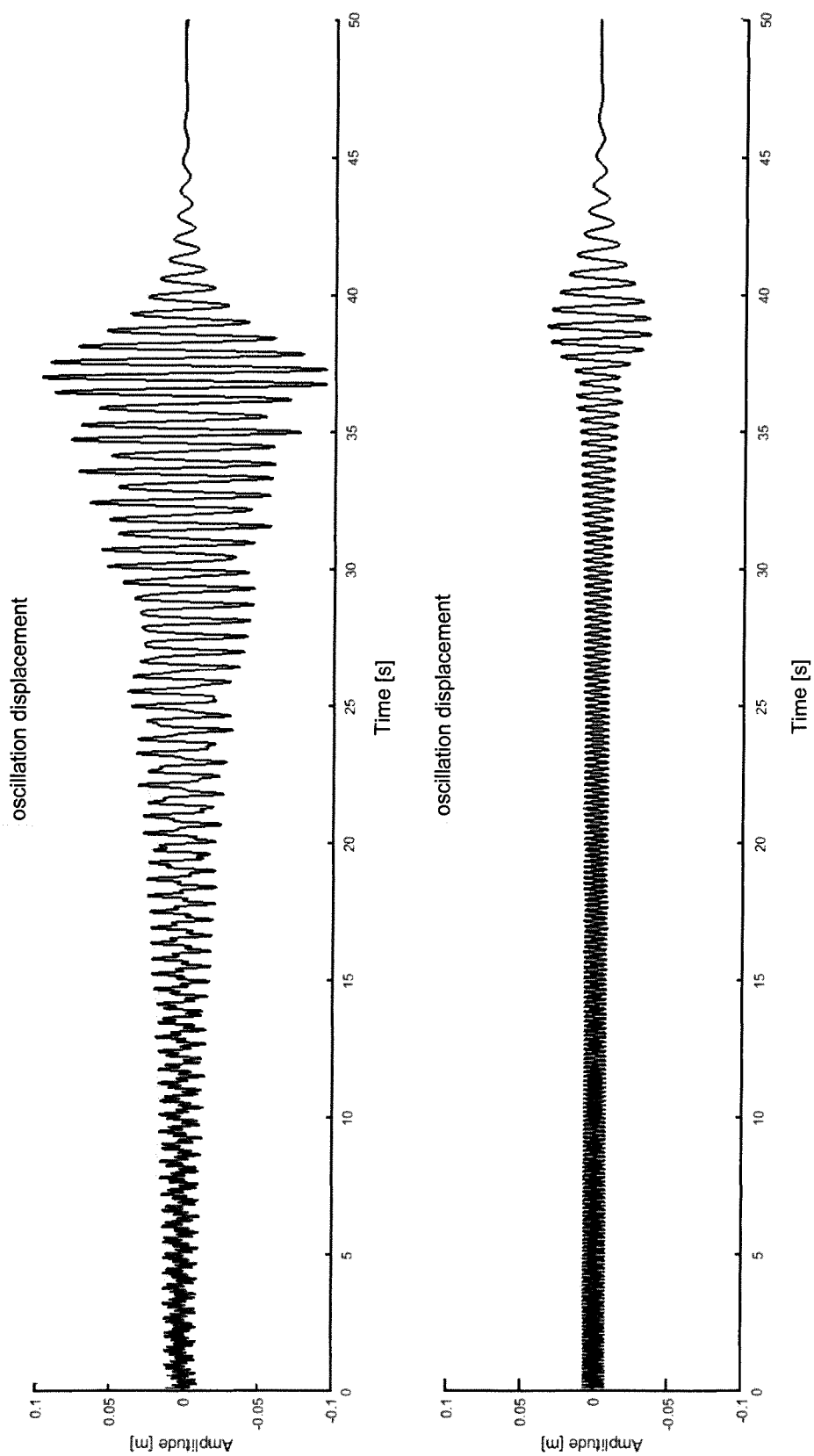
FIG. 10 shows two vibration diagrams in which the decay behavior of a vibrating machine mounted on a conventional bearing device is compared to that of a vibrating machine mounted on a bearing device according to the invention.

The curves in FIGS. 9 and 10 originate from a simulation but have been verified by numerous measurements in a testing environment.

Finally, FIG. 11 shows a diagram with two measurement curves showing the die-out of a vibrating machine after being turned off, one curve representing a bearing device according to the invention and one representing a conventional bearing device. The vibration machine is turned off here at approximately 22 seconds followed by die-out. First excesses due to resonance can be seen from approximately 35-40 seconds. A markedly lower and more rapidly diminishing vibration of the vibrating machine mounted on the bearing device of the invention can be recognized here following the resonance sweep as compared to the vibrating machine mounted on a conventional bearing device, in the present case on a conventional air spring.

With the bearing device according to the invention, during startup and rundown of the vibrating machine 2 unwanted resonant vibration of the vibratory machine part 21 is effectively prevented or at least limited to a harmless level by strong damping. In addition, in ongoing operation of the vibrating machine 2 at its operating frequency virtually no damping or merely a slight, non-disruptive vibration damping of the vibratory machine part 21 is produced by the bearing device 1. The bearing device 1 of the invention is thus capable of fulfilling two technical demands which at first glance appear to be contradictory.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

| Number | Designation |
| --- | --- |
| 1 | bearing device |
| 10 | air spring |
| 11 | compressed air reservoir |
| 11' | additional compressed air reservoir |
| 11" | shutoff valve |
| 12 | duct between 10 and 11 |
| 13 | throttle in 12 |
| 14 | compressed air source |
| 2 | vibrating machine |
| 20 | vibratory drive |
| 21 | first machine part |
| 22 | second machine part |
| 3 | control unit |
| 30 | vibration sensor |
| 31 | measuring line between 30 and 3 |
| 32 | control line between 3 and 13 |

The invention claimed is:

1. A vibrating machine comprising:
a first machine part that vibrates in operation,
a second machine part connected to an installation area of the vibrating machine, and
a vibratory drive,
wherein a resilient bearing system is arranged between the machine parts and has at least one air spring per support point and at least one compressed air reservoir fluidically connected to the air spring, and
wherein a throttle is switched in between the air spring and the compressed air reservoir,
wherein the bearing system with the first vibratory machine part has a resonant or natural frequency lower than an operating frequency of the vibrating machine,
wherein the bearing system has a frequency-dependent lower stiffness level with high damping at low frequencies, an upper stiffness level with low damping at higher frequencies, and a transition zone lying in between at a transitional frequency, and
wherein the throttle is dimensioned such that the transitional frequency is close to the resonant or natural frequency.

2. The vibrating machine according to claim 1, wherein the throttle is not adjustable.

3. The vibrating machine according to claim 1, wherein the throttle is adjustable.

4. The vibrating machine according to claim 3, wherein the throttle is switchable between a restricting position and a non-restricting position as a function of a detected vibration frequency of the first vibratory machine part.

5. The vibrating machine according to claim 4, wherein the non-restricting position of the throttle is a completely open position with an unrestricted fluidic connection between the air spring and the compressed air reservoir and with no damping of the air spring, or that the non-restricting position of the throttle is its completely closed position with the throttle blocking a fluidic connection between the air spring and the compressed air reservoir.

6. The vibrating machine according to claim 4, wherein in a case of vibration frequencies occurring during startup and rundown of the vibrating machine, the throttle assumes a restricting position damping the air spring, and in operation of the vibrating machine at an operating frequency the throttle assumes either a completely open or closed position, not damping the air spring in either case.

7. The vibrating machine according to claim 3, wherein the throttle is variable either infinitely or in several steps between more or less open, restricting positions with the air springs being damped and a non-restricting position as a function of a detected vibrating frequency of the vibrating first machine part.

8. The vibrating machine according to claim 3, wherein the adjustable throttle is formed by a throttle valve with an adjustable throughput cross-section or by a throttle line with an adjustable flow-through length.

9. The vibrating machine according to claim 1, wherein the vibrating machine has a resonant or natural frequency amounting to a maximum of one-half of a size of an operating frequency of the first vibratory machine part of the vibrating machine.

10. The vibrating machine according to claim 1, wherein a compressed air source is connected to at least one of the compressed air reservoir or to the air spring and wherein a specifiable, variable basic air pressure is settable in the compressed air reservoir and in the air spring via the compressed air source.

11. The vibrating machine according to claim 1, wherein the vibrating machine has one air spring per support point.

12. The vibrating machine according to claim 11, wherein the air springs of all support points are uniformly aligned.

13. The vibrating machine according to claim 1, wherein the vibrating machine has two air springs per support point arranged as a pair.

14. The vibrating machine according to claim 13, wherein the two air springs of each pair are placed against one another at an angle of up to 90°.

15. The vibrating machine according to claim 14, wherein the two air springs of each pair are aligned symmetrically to one another at uniform angles of up to 45° to the vertical.

16. The vibrating machine according to claim 13, wherein the two air springs of each pair are associated with one common compressed air reservoir and one single common throttle per pair.

17. The vibrating machine according to claim 1, wherein all air springs are associated with one single common compressed air reservoir and one single common throttle.

18. The vibrating machine according to claim 1, wherein each air spring is associated with its own compressed air reservoir and its own throttle.

19. The vibrating machine according to claim 1, wherein the compressed air reservoir has a variable, settable volume or that one or more additional compressed air reservoirs fluidically connectable to and separable from the compressed air reservoir is associated with the compressed air reservoir.

20. The vibrating machine according to claim 1,
wherein a control unit is associated with the vibrating machine, wherein a current vibration frequency of the first vibratory machine part is detectable and wherein the throttle is automatically adjustable, as a function of a detected vibration frequency, between a restricting position during a startup and rundown of the vibrating machine at vibration frequencies below the operating frequency, and an open or closed, non-restricting or only slightly restricting position in operation of the vibrating machine at its operating frequency.

21. A method of operating a vibrating machine having the features of claim 1, comprising the steps:
detecting a current vibration frequency of the first vibratory machine part,
adjusting the throttle as a function of the detected vibration frequency between a restricting position, with the air spring being damped, during startup and rundown of the vibrating machine at vibration frequencies below the operating frequency, and a non-restricting open or closed position, with the air spring in either case not being damped in operation of the vibrating machine at its operating frequency.

* * * * *